(12) United States Patent
Brdiczka et al.

(10) Patent No.: US 8,290,884 B2
(45) Date of Patent: Oct. 16, 2012

(54) METHOD FOR APPROXIMATING USER TASK REPRESENTATIONS BY DOCUMENT-USAGE CLUSTERING

(75) Inventors: Oliver Brdiczka, Mountain View, CA (US); Shane P. Ahern, Foster City, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 360 days.

(21) Appl. No.: 12/623,717

(22) Filed: Nov. 23, 2009

(65) Prior Publication Data

US 2011/0125679 A1 May 26, 2011

(51) Int. Cl.
*G06F 15/18* (2006.01)
*G06F 17/00* (2006.01)
*G06F 9/46* (2006.01)

(52) U.S. Cl. ............... 706/12; 715/200; 718/100
(58) Field of Classification Search .............. None
See application file for complete search history.

(56) References Cited

U.S. PATENT DOCUMENTS 7,676,761 B2 * 3/2010 Oliver et al. ............... 715/803

OTHER PUBLICATIONS

Gonzalez, Victor M. et al., "Constant, Constant, Multi-tasking Craziness": Managing Multiple Working Spheres, vol. 6, No. 1, CHI 2004, Apr. 24-29, pp. 113-120.
Mark, Gloria et al., "No Task Left Behind? Examining the Nature of Fragmented Work", CHI 2005, Apr. 2-7, Portland, Oregon, pp. 321-330.
Mark, Gloria et al., "The Cost of Interrupted Work: More Speed and Stress", In Proc. CHI '08, 107-110, 2008.
Oliver, Nuria et al., "SWISH: Semantic Analysis of Window Titles and Switching History", In Proc. IUI'06, pp. 194-201, 2006.
Rattenbury, Tye et al., "CAAD: An Automatic Task Support System", In Proc. CHI '07, pp. 687-696, 2007.
Shen, Jianqiang et al., "Real-Time Detection of Task Switches of Desktop Users", In Proc. IJCAI, 2007.
Shen, Jianqiang et al., "Detecting and Correcting User Activity Switches: Algorithms and Interfaces", In Proc. IUI '09, pp. 117-126, 2009.
Soules, Craig A.N. et al. "Connections: Using Context to Enhance File Search", SIGOPS Oper. Syst. Rev. 39(5): pp. 119-132, 2005.
Shi, Jianbo et al., "Normalized Cuts and Image Segmentation" IEEE Transactions on Pattern Analysis and Machine Intelligence, vol. 22, No. 8, Aug. 2000, pp. 888-905.
Dragunov, Anton N. et al., "TaskTracer: A Desktop Environment to Support Multi-tasking Knowledge Workers", IUI' 05, Jan. 9-12, 2005, San Diego, CA, pp. 75-82.

(Continued)

*Primary Examiner* — Alan Chen
(74) *Attorney, Agent, or Firm* — Shun Yao; Park, Vaughan, Fleming & Dowler LLP (57) ABSTRACT

Embodiments of the present invention provide a system for automatically creating a task representation associated with a user task. The system calculates usage footprints of a document based on other applications, documents, and people that have been accessed by the user within a predetermined time frame before and after the user accesses the document. After obtaining usage footprints of a number of documents, the system applies a clustering technique, such as spectral clustering, to create task representations, each including a collection (cluster) of documents and/or applications that are used for accomplishing a particular task. The system also filters the documents based on their average dwell times, and uses user feedback to merge or split different task clusters in order to provide accurate task representations.

18 Claims, 4 Drawing Sheets

OTHER PUBLICATIONS

Gyllstrom, Karl et al., "Activity put in context: Identifying implicit task context within the user's document interaction", IIiX' 08, Information Interaction in Context, 2008, London, UK, pp. 51-56.

Shen, Jianqiang et al., "A Hybrid Learning System for Recognizing User Tasks from Desktop Activities and Email Messages", IUI' 06, Jan. 29-Feb. 1, 2006, Sydney, Australia, pp. 86-92.

* cited by examiner

METHOD FOR APPROXIMATING USER TASK REPRESENTATIONS BY DOCUMENT-USAGE CLUSTERING

BACKGROUND

1. Field

This disclosure is generally related to task management. More specifically, this disclosure is related to using document-usage footprints to estimate user tasks.

2. Related Art

Modern-day workers often found themselves juggling multiple tasks and activities. Many task-management systems have been developed to assist these multitasking efforts. Task-management systems typically provide some efficient way of switching from one task to another. In order to facilitate task management and task switching, a task-management system needs to have knowledge of how a user's overall workspace is conceptually partitioned into the individual constituent tasks. Note that performing a task often involves the use of multiple applications, documents, and communication mechanisms with others.

One common problem facing the task-management system is to determine which documents or applications are associated with each task. For example, in order to assist a user with task switching, the system needs to recognize that task switching has occurred when the user opens a document belonging to a different task.

Conventional task-detection methods either require high amounts of user feedback, or provide a rather imprecise representation of a user's task. For example, some task-management systems rely on explicit user input for such knowledge, thus generating an extra burden for users. Some task-detection methods automatically learn a user's tasks in a supervised manner, which requires a user to provide task names/labels constantly in order to train the system. Due to the large amount of "extra work" involved in setting up such systems, normal users tend to reject such approaches. In contrast, unsupervised approaches do not require any feedback from users, but generally provide a poor task-detection result.

SUMMARY

One embodiment of the present invention provides a system for detecting user tasks. During operation, the system receives a number of documents, and applies a clustering technique to document-usage footprints of the documents to generate user task representations.

In a variation on this embodiment, the document-usage footprint of a respective document is calculated based on access frequencies to other documents within one or more predetermined time periods.

In a further variation, the predetermined time periods include at least one of: a predetermined time period before the respective document is accessed, a time period during which the respective document is accessed, and a predetermined time period after the respective document is accessed.

In a variation on this embodiment, the system further calculates an average dwell time for at least one document.

In a further variation, the dwell time of a document access is calculated by subtracting an idle time from an active time of the document.

In a further variation, the clustering technique is applied to documents whose average dwell time exceeds a predetermined threshold.

In a variation on this embodiment, the clustering technique includes spectral clustering.

In a variation on this embodiment, the system further obtains user feedback in order to merge and/or split the task representations.

BRIEF DESCRIPTION OF THE FIGURES

Table 1 illustrates exemplary document-usage footprints in accordance with an embodiment of the present invention.

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a system for automatically creating a task representation associated with a user task. The system calculates usage footprints of a document based on other applications, documents, and people that have been accessed by the user within a predetermined time frame before and after the user accesses the document. After obtaining usage footprints of a number of documents, the system applies a clustering technique, such as spectral clustering, to create task representations, each including a collection (cluster) of documents and/or applications that are used for accomplishing a particular task. The system also filters the documents based on their average dwell times, and uses user feedback to merge or split different task clusters in order to provide accurate task representations.

Document Usage Footprint

When a user is performing a certain task, he is most likely to access more than one document and/or application. In addition, he may communicate with other people in order to accomplish the task. People tend to work on a task for a prolonged period of time, and access multiple documents and/or applications within this time period. Therefore, a repeated pattern of opening two or more documents simultaneously or consecutively within a predetermined time period often indicates that these documents may be related to the same user task, thus the same task cluster. To identify task clusters, the system first calculates document-usage footprints. As explained in more detail below in conjunction with FIG. 1, a document-usage footprint describes a document's usage context instead of its content. Note that a document's usage context measures the temporal correlation among documents.

Figure 1:
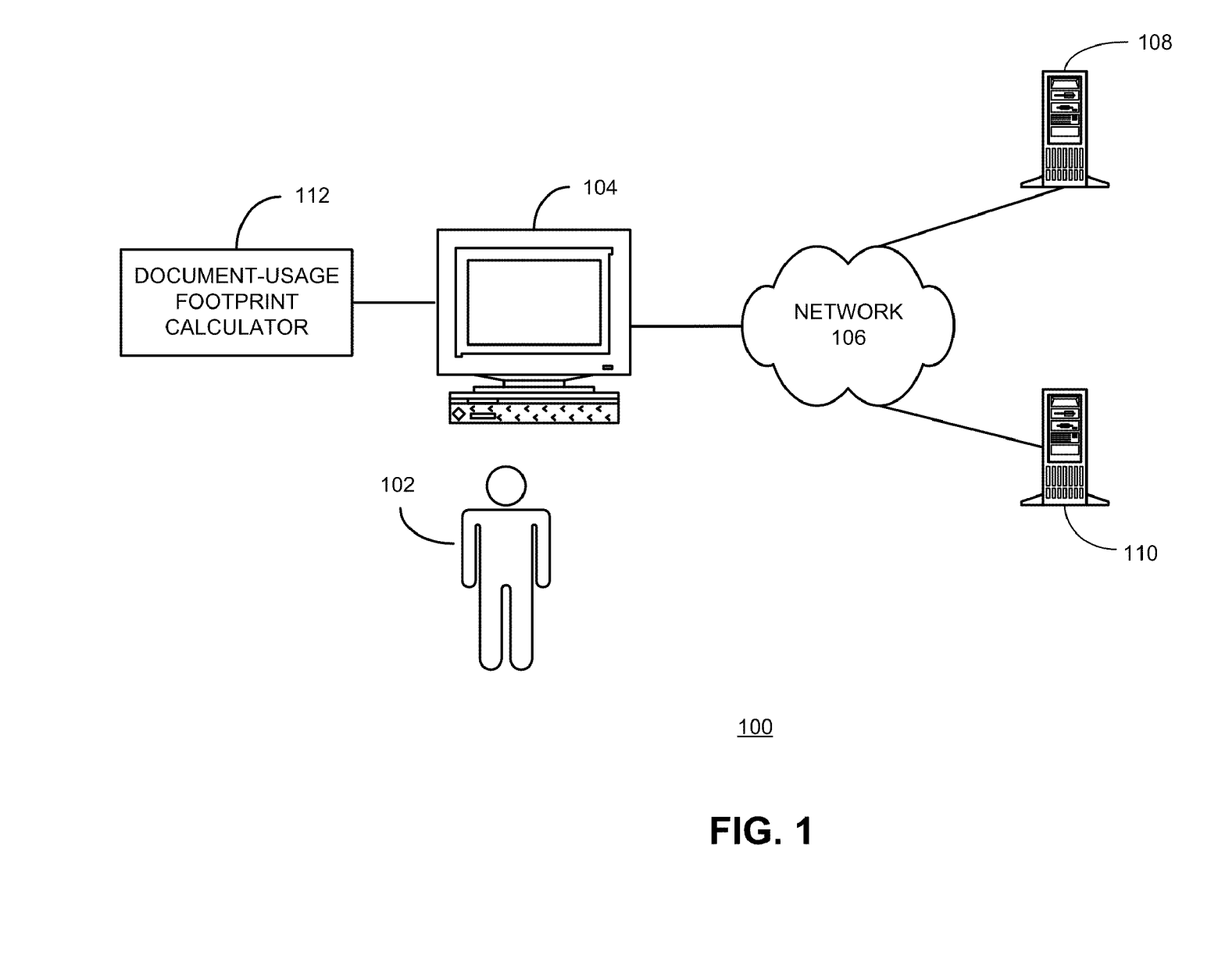
FIG. 1 presents a diagram illustrating a system for calculating document-usage footprints in accordance with an embodiment of the present invention.

FIG. 1 presents a diagram illustrating a system for calculating document-usage footprints in accordance with an embodiment of the present invention. In this example, a user 102 performs his task on a computer 104, which is coupled to a network 106. While performing the task, user 102 may need to access a number of documents and/or applications. These documents and/or applications can be located on computer 104 or on remote servers, such as servers 108 and 110, which are also coupled to network 106. Document-usage footprint calculator 112 monitors the user's usage of documents and/or applications, and calculates document-usage footprints for all accessed documents and/or applications.

In order to calculate a usage footprint for a document, the system timestamps each document and/or application when it is opened and closed. Based on these timestamps, document-usage footprint calculator 112 can calculate the document-usage footprints. During operation, each document is given a document ID. For each document ID, document-usage footprint calculator 112 tracks other documents and/or applications that are accessed by the user within a predetermined time frame that can be before, during, and after the document is accessed.

To calculate a document-usage footprint, the system first counts the number of times a document with a particular document ID has been accessed. Then the system uses the timestamp information to count the number of times other documents and/or applications have been accessed within a predetermined time frame in relation to the opening and closing of the particular document. In one embodiment, a document-usage footprint of a particular document is a list of normalized access-frequencies (normalized against the number of accesses to the particular document) organized by document ID. An entry in the list indicates the access-frequency to a document within certain time periods. For example, the system determines that a document A has been accessed n times by a user. The system then marks a number of time periods with predetermined duration, each either before, or during, or after the time period when document A is accessed. The system then determines that the user has accessed a document B m times during those marked time periods. Consequently, the system can generate a document-usage footprint entry for document A corresponding to a document B as as m/n. If the system determines that during those marked time periods the user makes no access to a document C, the document-usage footprint of document A then includes an entry corresponding to document C as 0. Table 1 illustrates exemplary document-usage footprints in accordance with an embodiment of the present invention. In Table 1, each row header is a document ID, and the corresponding row is its document-usage footprint. A respective cell in the row is the aforementioned normalized access-frequency to a document whose ID is listed as the corresponding column header.

TABLE 1

|   | A | B | C | D |
|---|---|---|---|---|
| A | 1 | 0 | 0.55 | 0 |
| B | 0 | 1 | 0 | 0.3 |
| C | 0.24 | 0.02 | 1 | 0 |
| D | 0 | 0.53 | 0.01 | 1 |

Generating Task Representation

Figure 2:
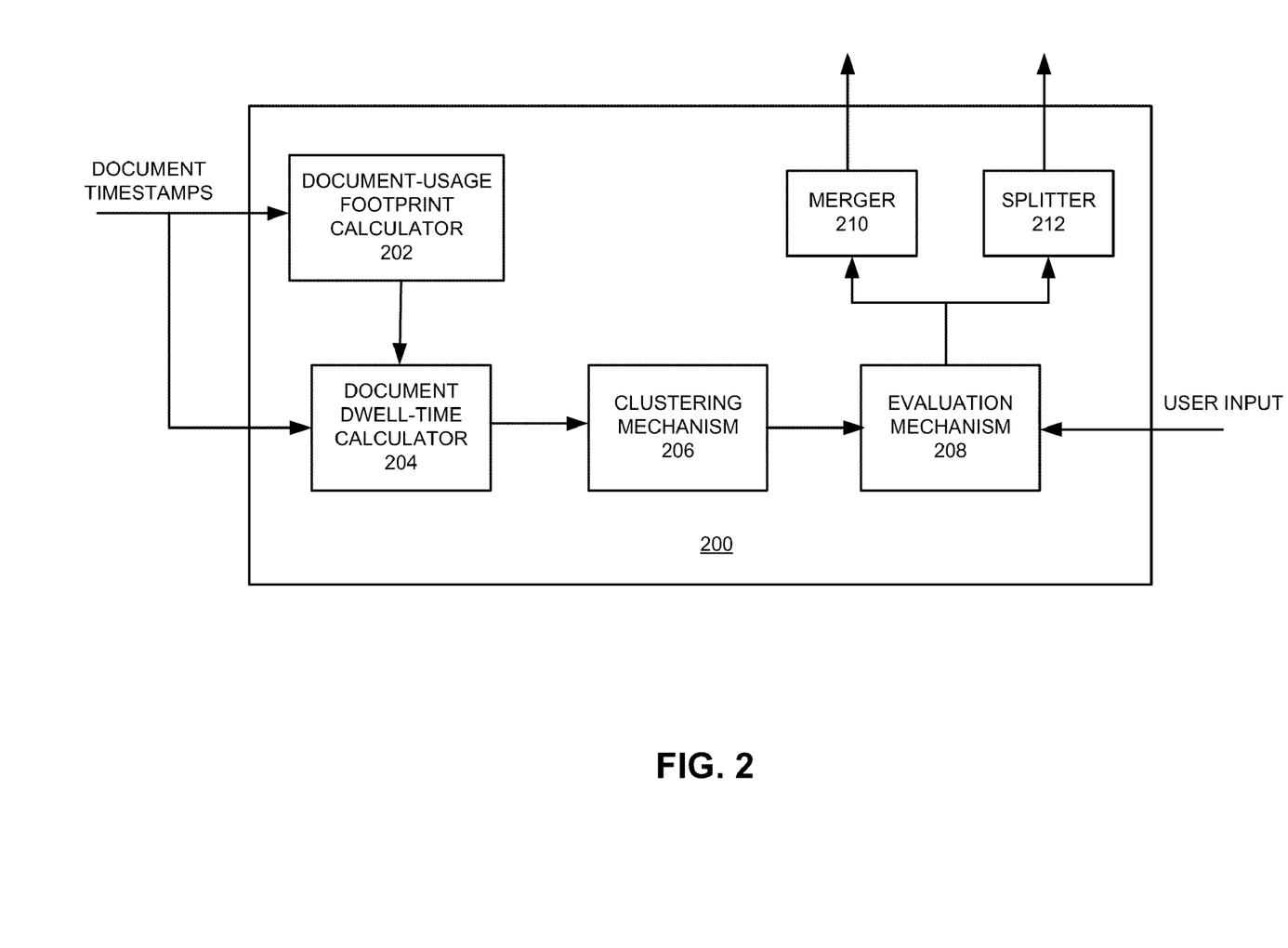
FIG. 2 presents a diagram illustrating a system for generating a user-task representation in accordance with an embodiment of the present invention.

FIG. 2 presents a diagram illustrating a system for generating a user-task representation in accordance with an embodiment of the present invention. System 200 includes a document-usage footprint calculator 202, a document dwell-time calculator 204, a clustering mechanism 206, an evaluation mechanism 208, a cluster merger 210, and a cluster splitter 212.

During operation, document-usage footprint calculator 202 receives timestamps for a number of documents, which indicate the times when the user opens and closes the documents, and calculates document-usage footprints for these documents. Because a task can often be characterized by a number of important documents, such as task reports, that need to be produced over a relatively long time period, the average time that a user works on a document can indicate whether the document is an important task-related document. In order to increase the accuracy of task representation, in one embodiment, the calculated document-usage footprints of all documents are filtered based on their average dwell time, which indicates the duration a user spends working on the document, and is calculated by a document dwell-time calculator 204. The document dwell time is defined as the difference between the time a document is active and the time it is idle. A document is active when it is the application of focus, such as being in the active window. Idle time refers to the time when the document is active but the user is neither moving the mouse (or other pointing device) nor using the keyboard. In one embodiment, document dwell-time calculator 204 calculates dwell time for every access of a document. These calculated dwell time can be used to select documents whose average dwell time of all accesses is above a predetermined threshold. For example, if a document has been accessed many times, but the average dwell time of all the accesses is below a predetermined threshold, then the system can determine that this particular document is of less importance, thus disregarding it in the future clustering operation.

After all documents with average dwell times longer than the threshold are selected, clustering mechanism 206 applies a clustering technique, which is a method of unsupervised learning, to the selected documents. The document-usage footprint of a particular document can be viewed as a data point for the clustering operation. In one embodiment, clustering mechanism 206 uses a spectral clustering technique to divide the selected documents into clusters (or subsets of documents). In a further embodiment, while applying the spectral clustering technique, clustering mechanism 206 constructs a similarity matrix based on the document-usage footprints of the selected documents. Note that the normalized access frequencies in the footprint correspond to the similarity between documents. For example, in the example shown in Table 1, a similarity matrix can be constructed as:

$$\begin{pmatrix} 1 & 0 & 0.55 & 0 \\ 0 & 1 & 0 & 0.3 \\ 0.24 & 0.02 & 1 & 0 \\ 0 & 0.53 & 0.01 & 1 \end{pmatrix}.$$

Each row of the above matrix is the document-usage footprint of a document. The corresponding document IDs, from top to bottom, for the footprints are A, B, C, and D. After applying a clustering technique, the similarity matrix can be rearranged as:

$$\begin{pmatrix} 1 & 0.55 & 0 & 0 \\ 0.24 & 1 & 0.02 & 0 \\ 0 & 0 & 1 & 0 \\ 0 & 0.01 & 0.53 & 1 \end{pmatrix}.$$

Note that the document IDs corresponding to the rearranged similarity matrix are now A, C, B, and D, also from top to bottom. In one embodiment, the system then divides the matrix into "clusters" based on a user-defined threshold. For example, the system can divide the rearranged matrix into two clusters, each including two documents, shown as follows:

$$\begin{pmatrix} \boxed{\begin{matrix} 1 & 0.55 \\ 0.24 & 1 \end{matrix}} & \begin{matrix} 0 & 0 \\ 0.02 & 0 \end{matrix} \\ \begin{matrix} 0 & 0 \\ 0 & 0.01 \end{matrix} & \boxed{\begin{matrix} 1 & 0 \\ 0.53 & 1 \end{matrix}} \end{pmatrix}.$$

Based on the clustering result, the system can divide the documents into clusters. In the example shown above, the system can divide document A-D into two clusters, one including documents A and C, and the other including documents B and D. Note that these clusters correspond to the inherent states or distributions of document usage as they occur when a user works on his tasks. A cluster typically represents either the whole task or steps of a task. Note that a task representation (a collection of documents representing a task) can be a weighted (or probability) list of documents. Different task representations can include the same documents but with different weights (probabilities). In one embodiment, the weight is calculated based on the correlation between documents.

The clustering result of clustering mechanism 206 is often referred to as initial "machine" representations of the user's task. These results often contain a large number of initial clusters, and these initial clusters may not accurately reflect the user's task. To improve the accuracy of the clustering result, evaluation mechanism 208 evaluates the quality of the output of clustering mechanism 206. In one embodiment, three measures, including average cluster purity (ACP), average task purity (ATP), and overall criterion (Q), are used to evaluate the clustering result.

The ACP is a measure of how well a detected cluster is limited to only one task, and a high ACP value can indicate that the detected clusters are relatively pure, with each cluster corresponding to only one user task. The ACP value can be calculated as $$ACP = \frac{1}{N} \sum_{i=1}^{N_c} p_{i\bullet} \times n_{i\bullet},$$

where $$p_{i\bullet} = \sum_{j=1}^{N_t} \frac{n_{ij}^2}{n_{i\bullet}^2}.$$

The ATP value, on the other hand, is a measure of how well one task is limited to only one cluster, and a high ATP value can indicate that a task is likely to be represented by only one cluster. The ATP value can be calculated as $$ATP = \frac{1}{N} \sum_{j=1}^{N_t} p_{\bullet j} \times n_{\bullet j},$$

where $$p_{\bullet j} = \sum_{i=1}^{N_c} \frac{n_{ij}^2}{n_{\bullet j}^2}.$$

Note that in the above equations N is the total number of observations, $N_c$ the total number of clusters, $N_t$ the total number of tasks, $n_{ij}$ the total number of observations in cluster i belonging to task j, the total number of observations in cluster i, and $n_{\bullet j}$ is the total number of observations belonging to task j. The overall criterion Q combines the ACP value and the ATP value, and can be expressed as $Q=\sqrt{ACP \times ATP}$. A larger Q value can indicate better overall performance of the system.

By selecting an appropriate clustering threshold, one can obtain initial "machine" task representations that include a large number of initial clusters (compared with the actual number of user tasks), thus obtaining a high ACP value. However, as the number of initial clusters is high (compared with the number of tasks), the ATP value may be low, which means that tasks are mostly likely to be covered by more than one cluster. In order to adapt/synchronize the initial unsupervised "machine" task representations of the user's tasks to an "actual" user task representation, in one embodiment, the system allows the user to provide minimum feedback based on the evaluation result provided by evaluation mechanism 208.

In one embodiment, if the evaluated ATP value is low (compared with a high ACP value), the system allows the user to select clusters that correspond to the same task representation based on the user's mental task representation. For example, an initial "machine" task representation may include 10 clusters and has a high ACP value. In other words, the documents and/or applications accessed by the user are divided into 10 clusters. However, instead of 10 tasks, the user may be actually working on only four tasks, resulting in a mental task representation that includes four clusters (and a low ATP value). To provide an accurate task representation, the user selects clusters that actually include documents and/or applications corresponding to the same task. The selected clusters can be sent to cluster merger 210 to be merged together. Similarly, if the ACP value becomes low (compared with a high ATP value), the system allows the user to select document clusters that include documents belonging to multiple tasks. A selected cluster can be sent to cluster splitter 212 to be split into multiple clusters. In one embodiment, the "merging" and "splitting" processes can be repeated iteratively until the clustering result converges toward the user's mental task representation, or until the Q value exceeds a predetermined threshold.

In one embodiment of the present invention, the system for generating a user-task representation is located on the same computer, such as computer 104, where the user performs his task. In a further embodiment, the system is located on a remote server, such as servers 108 and 110. When located on a remote server, the user-task-representation generation system can generate task representations for multiple users based on their accesses of various documents and/or applications. Note that in a collaborative environment a given task often involves multiple users. In one embodiment, the system provides task representations that include not only documents but also users.

Figure 3:
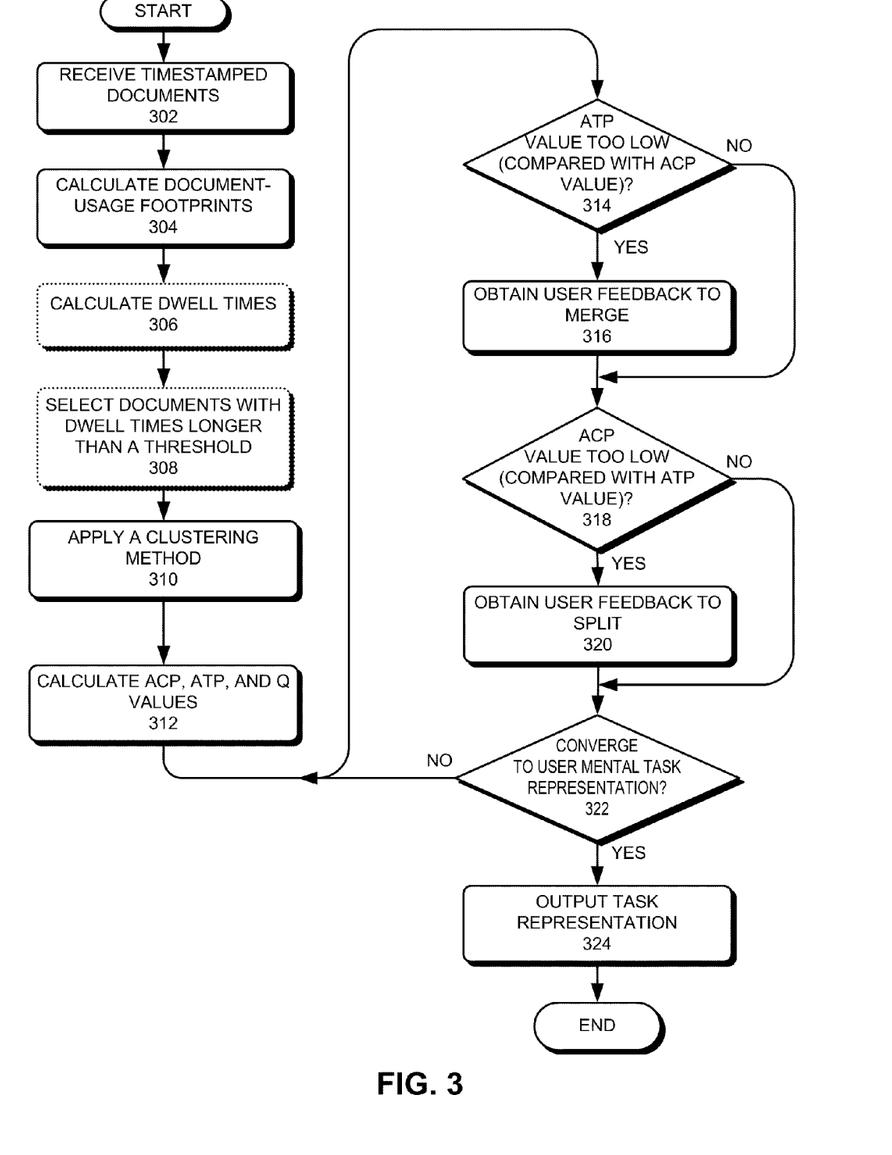
FIG. 3 presents a flow chart illustrating the process of generating a task representation in accordance with an embodiment of the present invention.

FIG. 3 presents a flow chart illustrating the process of generating a task representation in accordance with an embodiment of the present invention. During operation, the system receives a number of timestamped documents (operation 302), and calculates document-usage footprints for each document based on the timestamps (operation 304). In one embodiment, the document-usage footprint of a particular document includes normalized access frequencies to other documents within a certain time frame. In one embodiment, such time frame includes predetermined time periods before, during, and after the particular document is accessed by the user. In a further embodiment, each document is assigned a document ID, and the normalized access frequencies are organized using document IDs.

Optionally, the system calculates the dwell time for all accesses of each document (operation 306), and selects documents whose average dwell times exceed a predetermined threshold (operation 308). Note that documents with shorter average dwell times are less important; thus, a task representation may not include such documents.

Subsequently, the system applies a clustering method to the document-usage footprints of selected documents to obtain an initial "machine" task representation (operation 310). In one embodiment, the system applies a spectral clustering method. The system evaluates the clustering performance by calculating the ACP, ATP, and Q values of the initial "machine" task representation (operation 312). If the system determines that the ATP value is low (compared with a high ACP value) (operation 314), user feedback is obtained to merge clusters corresponding to same tasks (operation 316). Otherwise, the system determines whether the ACP value is low (compared with a high ATP value) (operation 318). If so, user feedback is obtained to split clusters that correspond to multiple tasks (operation 320). If not, the system then determines whether the clustering result converges with the user's mental task representation (operation 322). If so, the system outputs the task representation (operation 324). If not, the system repeats the merging and splitting operation.

Figure 4:
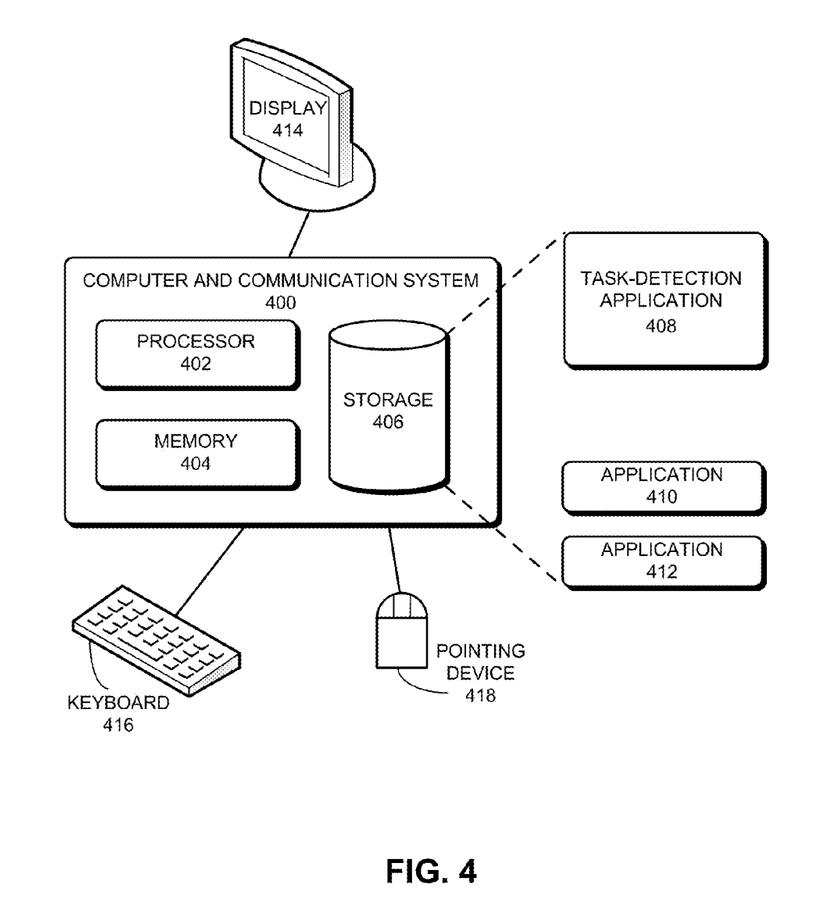
FIG. 4 illustrates an exemplary computer system for detecting user tasks in accordance with one embodiment of the present invention.

FIG. 4 illustrates an exemplary computer system for detecting user tasks in accordance with one embodiment of the present invention. In one embodiment, a computer and communication system 400 includes a processor 402, a memory 404, and a storage device 406. Storage device 406 stores a task-detection application 408, as well as other applications, such as applications 410 and 412. During operation, task-detection application 408 is loaded from storage device 406 into memory 404 and then executed by processor 402. While executing the program, processor 402 performs the aforementioned functions. Computer and communication system 400 is coupled to an optional display 414, keyboard 416, and pointing device 418.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-executable method for detecting user tasks, the method comprising:
   receiving a number of documents;
   calculating document-usage footprints for the received documents;
   calculating document dwell times for the received documents;
   selecting a subset of documents from the received documents such that the document dwell times of the selected documents exceed a predetermined threshold; and
   applying a clustering technique to the calculated document-usage footprints of the selected documents to generate user task representations.

2. The method of claim 1, wherein a document-usage footprint of a respective document is calculated based on access frequencies to other documents within one or more predetermined time periods.

3. The method of claim 2, wherein the predetermined time periods include at least one of:
   a predetermined time period before the respective document is accessed;
   a predetermined time period within a time period when the respective document is accessed; and
   a predetermined time period after the respective document is accessed.

4. The method of claim 1, wherein calculating a dwell time of a respective document involves subtracting an idle time from an active time of the document.

5. The method of claim 1, wherein the clustering technique includes spectral clustering.

6. The method of claim 1, further comprising:
   obtaining user feedback in order to merge and/or split the task representations.

7. A computer-readable storage medium storing instructions that when executed by a computer cause the computer to perform a method for detecting user tasks, the method comprising:
   receiving a number of documents;
   calculating document-usage footprints for the received documents;
   calculating document dwell times for the received documents;
   selecting a subset of documents from the received documents such that the document dwell times of the selected documents exceed a predetermined threshold; and
   applying a clustering technique to the calculated document-usage footprints of the selected documents to generate user task representations.

8. The computer-readable storage medium of claim 7, wherein a document-usage footprint of a respective document is calculated based on access frequencies to other documents within one or more predetermined time periods.

9. The computer-readable storage medium of claim 8, wherein the predetermined time periods include at least one of:
- a predetermined time period before the respective document is accessed;
- a predetermined time period within a time period when the respective document is accessed; and
- a predetermined time period after the respective document is accessed.

10. The computer-readable storage medium of claim 7, wherein calculating a dwell time of a respective document involves subtracting an idle time from an active time of the document.

11. The computer-readable storage medium of claim 7, wherein the clustering technique includes spectral clustering.

12. The computer-readable storage medium of claim 7, wherein the method further comprises obtaining user feedback in order to merge and/or split the task representations.

13. A system for detecting user tasks, the system comprising:
- a receiving mechanism configured to receive a number of documents;
- a document-usage calculating mechanism configured to calculate document-usage footprints for the received documents;
- a dwell-time calculation mechanism configured to calculate document dwell times for the received documents;
- a selection mechanism configured to select a subset of documents from the received documents such that the document dwell times of the selected documents exceed a predetermined threshold; and
- a clustering mechanism configured to apply a clustering technique to the calculated document-usage footprints of the selected documents to generate user task representations.

14. The system of claim 13, wherein a document-usage footprint of a respective document is calculated based on access frequencies to other documents within one or more predetermined time periods.

15. The system of claim 14, wherein the predetermined time periods include at least one of:
- a predetermined time period before the respective document is accessed;
- a predetermined time period within a time period when the respective document is accessed; and
- a predetermined time period after the respective document is accessed.

16. The system of claim 13, wherein a dwell time of a document is calculated by subtracting an idle time from an active time of the document.

17. The system of claim 13, wherein the clustering technique includes spectral clustering.

18. The system of claim 13, further comprising a feedback mechanism configured to obtain user feedback in order to merge and/or split the task representations.

* * * * *